US012761409B2

(12) United States Patent
Weitz et al.

(10) Patent No.: US 12,761,409 B2
(45) Date of Patent: Oct. 13, 2026

(54) METHOD FOR PRODUCING A CONTINUOUS DIFFRACTIVE OPTICAL ELEMENT, DEVICE FOR CARRYING OUT THE PRODUCTION METHOD AND CONTINUOUS DIFFRACTIVE OPTICAL ELEMENT

(71) Applicant: RHEINISCHE FRIEDRICH-WILHELMS-UNIVERSITÄT BONN, Bonn (DE)

(72) Inventors: Martin Weitz, Bonn (DE); Christian Wahl, Bonn (DE); David Dung, Bonn (DE)

(73) Assignee: RHEINISCHE FRIEDRICH-WILHELMS-UNIVERSITÄT BONN, Bonn (DE)

( * ) Notice: Subject to any disclaimer, the term of this patent is extended or adjusted under 35 U.S.C. 154(b) by 652 days.

(21) Appl. No.: 17/913,062

(22) PCT Filed: Feb. 18, 2021

(86) PCT No.: PCT/EP2021/054010
§ 371 (c)(1),
(2) Date: Sep. 20, 2022

(87) PCT Pub. No.: WO2021/190831
PCT Pub. Date: Sep. 30, 2021

(65) Prior Publication Data

US 2023/0375760 A1 Nov. 23, 2023

(30) Foreign Application Priority Data

Mar. 23, 2020 (DE) ..................... 10 2020 107 944.3

(51) Int. Cl.
*G02B 5/18* (2006.01)
*B23K 26/00* (2014.01)
(Continued)

(52) U.S. Cl.
CPC ........ *G02B 5/1852* (2013.01); *B23K 26/0006* (2013.01); *B23K 26/083* (2013.01);
(Continued)

(58) Field of Classification Search
CPC .... B23K 26/367; B23K 26/352; B23K 26/55; G02B 5/1852
(Continued)

(56) References Cited

U.S. PATENT DOCUMENTS 6,017,658 A * 1/2000 Rhee ......................... G03F 1/22
430/5
6,310,905 B1 * 10/2001 Shirai .................. G02B 5/0891
359/360
(Continued)

FOREIGN PATENT DOCUMENTS

CN 103509478 A 1/2014
CN 104781938 A 7/2015
(Continued)

OTHER PUBLICATIONS

PCT International Search Report and Written Opinion (w/ English translation) for corresponding PCT Application No. PCT/EP2021/054010, mailed on May 12, 2021, 14 pages.
(Continued)

*Primary Examiner* — Audrey Y Chang
(74) *Attorney, Agent, or Firm* — Dority & Manning, P.A.

(57) ABSTRACT

In one aspect, a method for producing a diffractive optical element for beam shaping of a laser beam having a first wavelength of at least 100 nm includes providing a laser mirror, the laser mirror having a layered structure made of a substrate, a dielectric layer and optionally an absorption layer, the dielectric layer resting against the substrate or the absorption layer being located between the substrate and the dielectric layer. The method also includes creating a plural-
(Continued)

Figure 1:
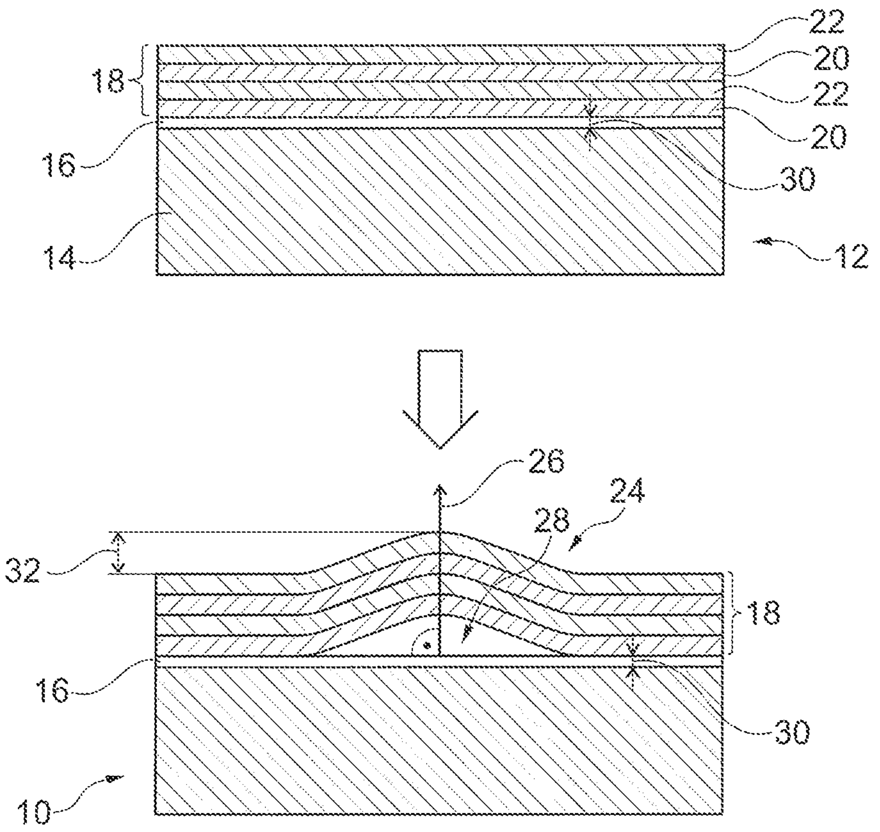

ity of bulges of the dielectric layer by treating the laser mirror with a series of focused heating laser beams having a second wavelength ($\lambda_2$), the plurality of bulges having a height perpendicular to the dielectric layer, and at least one bulge having a height of at least half the first wavelength ($\lambda_1$).

13 Claims, 1 Drawing Sheet

(51) Int. Cl.
*B23K 26/08* (2014.01)
*B23K 26/55* (2014.01)
*G02B 1/113* (2015.01)
*G02B 5/08* (2006.01)
*G02B 27/42* (2006.01)

(52) U.S. Cl.
CPC .............. *B23K 26/55* (2015.10); *G02B 1/113* (2013.01); *G02B 5/0891* (2013.01); *G02B 5/1861* (2013.01); *G02B 27/4244* (2013.01)

(58) Field of Classification Search
USPC ................ 359/572, 576, 355, 360; 264/400; 250/492.3
See application file for complete search history.

(56) References Cited

U.S. PATENT DOCUMENTS

2004/0218186 A1 11/2004 Viol
2009/0273772 A1 11/2009 Takai
2015/0306704 A1* 10/2015 Sohn .................... B23K 26/364 264/400
2016/0377988 A1* 12/2016 Paul ..................... G02B 27/005 359/355
2019/0018324 A1 1/2019 Pauls et al.
2020/0331100 A1* 10/2020 Richter .................. B23K 26/53

FOREIGN PATENT DOCUMENTS

| | | | |
|---|---|---|---|
| CN | 106104317 | A | 11/2016 |
| DE | 198 23 257 | | 2/2000 |
| DE | 10 2019 204345 | | 5/2019 |
| DE | 102018200029 | A1 | 7/2019 |
| JP | 2003-285178 | A | 10/2003 |
| JP | 2013-528492 | A | 7/2013 |
| JP | 2019508748 | A | 3/2019 |
| WO | WO2009114375 | A2 | 9/2009 |
| WO | WO 2019/134807 | A1 | 7/2019 |

OTHER PUBLICATIONS

B. W. Shore et al. "Design of high-efficiency dielectric reflection gratings," *Journal of the Optical Society of America A*, vol. 14. No. 5. May 1, 1997, (Abstract only) pp. 1124-1136.
Smuk et al., "Direct laser writing of diffractive optics in glass", Optics Letters, 1997, vol. 22, No. 13, pp. 1030-1032.
Office Action (w/ English translation) for corresponding German Application No. 102020107944.3, dated Aug. 7, 2020, 8 pages.
German Office Action (w/ Machine translation) for corresponding Application No. 102020107944.3, dated Feb. 20, 2024, 13 pages.
Chinese Office Action (w/ English Translation) for corresponding Application No. 202180021526.6, dated Mar. 24, 2025, 40 pages.
Office Action (with English translation) received in corresponding Application No. JP 2022555115, dated May 30, 2025, 5 pages.
Office Action (w/ English translation) in corresponding CN Application No. 202180021526.6, dated Sep. 30, 2025, in 14 pgs.
Office Action (w/ English translation) in corresponding JP Application No. 2022-555115, dated Oct. 24, 2025, in 7 pgs.
Office Action (w/ English translation) in corresponding CN Application No. 202180021526.6, dated Mar. 5, 2026, in 14 pgs.

* cited by examiner

METHOD FOR PRODUCING A CONTINUOUS DIFFRACTIVE OPTICAL ELEMENT, DEVICE FOR CARRYING OUT THE PRODUCTION METHOD AND CONTINUOUS DIFFRACTIVE OPTICAL ELEMENT

This application is a national phase application of International Patent Application No. PCT/EP2021/054010, filed Feb. 18, 2021, which, in turn, is based upon and claims the right of priority to German Patent Application No. 10 2020 107 944.3, filed on Mar. 23, 2020, the disclosures of both of which are hereby incorporated by reference in their entirety for all purposes.

The invention relates to a method for producing a continuous diffractive optical element for beam shaping of a laser beam having a first wavelength.

Furthermore, the invention relates to a device for carrying out the above method and the continuous diffractive optical element.

Diffractive optical elements, abbreviated DOE, allow the beam shaping of a laser beam, that is, the targeted change in the intensity distribution of the laser beam profile perpendicular to the direction of propagation. To shape the beam, the DOE is introduced into the laser beam, wherein phase modulations of the laser beam occur due to different optical path lengths at the DOE, resulting in interference patterns. The intensity of the laser beam is spatially modulated by constructive and destructive superimposition. In this way, the usually Gaussian intensity profile of the laser beam can be changed in a targeted manner and, for example, converted into a doughnut-shaped intensity profile.

DOEs known in the prior art are glass or plastic substrates onto which microstructures are applied by laser lithography and/or photolithography and by various wet and dry chemical etching processes. For example, a blazed grating can be applied as a microstructure, that is, an optical grating in which the individual grating lines have a triangular sawtooth-shaped cross section, as a result of which the diffraction efficiency for a specific diffraction order is maximized.

However, the production of DOE having high diffraction efficiency is very complex. For a high diffraction efficiency, it is necessary for the microstructures to have a height profile that is as continuous as possible, which in turn entails a very high technical manufacturing effort. Due to the manufacturing methods using a lithographic etching process, the height profile is usually approximated by a step profile having a discrete number of steps, the number of steps being increased by repeating the lithographic etching process, the height profile thus being better approximated. Such DOEs having multiple steps are referred to as multilevel DOEs. Due to the process, however, the number of steps is limited to about 16, since after about tour repetitions of the etching process, the manufacturing-related inaccuracies increase and no higher diffraction efficiency is achieved. Multilevel DOE are thus physically limited in their diffraction efficiency to about 98%.

Furthermore, quasi-continuous DOEs are known from the prior art, which are produced by means of a maskless lithography method by means of two-photon polymerization. A polymer applied to a substrate is usually structured directly by means of laser radiation for this purpose. The quasi-continuous DOEs have a diffraction efficiency equivalent to more than 50 steps. However, the use of such quasi-continuous DOEs is limited since they are not suitable for use in high-power lasers due to the low thermal damage threshold of the polymers.

The publication Smjuk A. Y., Lawandy, N. M.: Direct laser writing of diffractive optics in glass. Opt. Lett., 1997, Vol. 22, No. 13, pp. 1030-1032 describes a method for producing diffractive optical elements from glasses doped with semiconductors by means of a low-power laser and a thermal expansion process.

The publication Shore, B. W. et al.: Design of high-efficiency dielectric reflection gratings, J. Opt. Soc. Am. A, 1997, Vol. 14, No, 5, pp. 1124-1136 describes examples of designs for purely dielectric reflection gratings, commenting on the relationship between transmission gratings and reflection gratings. Furthermore, examples of high efficiency (95%) gratings produced using hafnium and silica multilayers are described.

Document US 2009/0 273 772 A1 describes a light reflecting mask comprising a reflecting layer provided on a substrate and reflecting light, an absorbing layer provided on the reflecting layer and absorbing light, a device pattern formed in a first region of the absorbing layer, and a reflectance measurement pattern formed in a second region of the absorbing layer.

Accordingly, the object of the invention is to provide a DOE, a method for producing such a DOE, and a device for carrying out the production method, the DOE having a high diffraction efficiency and being suitable for use in beam shaping of high-power lasers.

This object is achieved by the features of the independent patent claims. Preferred developments are found in the dependent claims.

The invention relates to a method for producing a diffractive optical element for beam shaping of a laser beam having a first wavelength of at least 100 nm, comprising the steps:

providing. a laser mirror, the laser mirror having a layered structure made of a substrate, a dielectric layer and optionally an absorption layer, the dielectric layer resting against the substrate or the absorption layer being located between the substrate and the dielectric layer.

creating a plurality of bulges of the dielectric layer by treating the laser mirror with a series of focused heating laser beams having a second wavelength, the plurality of bulges having a height perpendicular to the dielectric layer, and at least one bulge having a height of at least half the first wavelength.

The core of the invention lies in the fact that a continuous DOE is produced by producing bulges in a laser mirror by means of targeted heating. The method allows a DOE to be produced with a very high diffraction efficiency, which, converted to the production accuracy of quasi-continuous DOEs, can correspond to a number of steps of more than 2500. The laser mirror provided and the DOE produced by the method comprise the substrate, the optional absorption layer and the dielectric layer, all of which are preferably parallel to one another, the dielectric layer resting against the substrate or, in the presence of the absorption layer, the absorption layer being arranged between the substrate and the dielectric layer. In particular, it is provided that an underside of the dielectric layer or an underside of the absorption layer adjoins an upper side of the substrate. It is further preferably provided that when the absorption layer is present, an upper side of the absorption layer adjoins an underside of the dielectric layer. In other words, the upper side of the dielectric layer corresponds to the upper side of the DOE or the upper side of the laser mirror.

In contrast to the methods known in the prior art, in which microstructures are created by adding material and/or by removing material and such that the DOE is produced, the present method provides that the microstructuring takes place by generating the plurality of bulges of the dielectric layer of the laser mirror. Thus, after treating the laser mirror with the series of focused heating laser beams having the second wavelength, it is not necessary to apply additional layers of material and/or to remove layers of material in order to produce the DOE with the very high diffraction efficiency. In other words, the DOE is produced by providing the laser mirror, which itself comprises the substrate and the dielectric layer, and then treating the laser mirror with the focused heating laser beams directly and thus without adding and/or removing material. In contrast to the methods of the prior art, a time-consuming lithographic and/or coating process is avoided in the method according to the invention.

In the method, bulges are produced in the dielectric layer, which lead to a microstructuring of the surface of the dielectric layer. This means in particular that the surface of the dielectric layer is not flat after the method, but has local regions having a different height than before the method. The height of the bulges refers to an extent of the bulge perpendicular to the dielectric layer relative to a region around the local region. The bulges are preferably rotationally symmetrical, the axis of rotation of the bulges being perpendicular to the absorption layer. For example, the bulges are circular when projected onto a plane parallel to the absorption layer. For rotationally symmetrical bulges, the full width at half maximum of the rotationally symmetrical bulges is further preferably not greater than 6 nm.

The height of the bulges influences the use of the DOE for beam shaping of the laser beam having the first wavelength, since beam shaping with the DOE is only possible when at least one bulge has a height of at least half the first wavelength. The method makes it possible to produce DOEs that are suitable for shaping a laser beam having a first wavelength of at least 100 nm. In other words, this means that at least one bulge has a height greater than 50 nm.

The method has the advantage that the bulges can be produced in a targeted manner by the treatment with the heating laser beam, wherein, on the one hand, the location of the bulge in relation to the plane parallel to the dielectric layer and the height of the bulge can be controlled. The method can be used to produce bulges having different heights, the height resolution being at least 0.5 nm. In particular, the height resolution is at least 0.1 nm. In other words, the method allows the production of very finely graded height profiles as structuring. The method thus enables the production of continuous DOEs having a very high diffraction efficiency, which, converted to the production accuracy of quasi-continuous DOES, corresponds to a number of steps of more than 2500.

With regard to the height of the bulges and the full width at half maximum in the case of rotationally symmetrical bulges, it is preferably provided that a topographical recording of the dielectric layer is created by means of a Mirau interferometer for the purpose of determining these parameters: The Mirau interferometer comprises an illumination source of short coherence length, preferably a green LED having a central wavelength of $\lambda=530$ nm, a camera for image acquisition (DCC1545M, Thorlabs) and a Mirau microscope objective (CF Plan 20× DI, Nikon). A front facet of the Mirau microscope objective preferably acts as a beam splitter, half of the LED light being bounced back onto a reference mirror in the interior of the Mirau microscope objective. Said half of the LED light preferentially passes through the reference arm of the interferometer. The LED light transmitted through the front facet is preferably reflected back by the dielectric layer of the DOE and overlaid with the LED light of the reference arm. In order for an interference pattern to be visible on the camera despite the low coherence length of the LED light, the path lengths of both interferometer arms are preferably chosen to be identical, apart from a few wave trains ($z_0 \approx z_{Ref}$). A topography of the dielectric layer of the DOE is preferably created by slowly displacing the DOE by around one micrometer using a piezoelectric crystal (time scale seconds) while the interference images are recorded using the camera. Then, preferably for each pixel of the camera (x=1 to 1000; y=1 to 1000), a brightness sequence is created from the stored recordings (typically 50 interference images). By adapting a function $\sin(\omega t+\varphi_0)$ with angular frequency $\omega$, a phase $\varphi_0(x, y)$ can be determined for each pixel. This is preferably done for all pixels (x, y) of the camera, so that a phase map can be created in which the adjusted phase can be entered at any location in the camera image. Phase jumps between adjacent pixels can occur within the phase map, since the adjusted phase is limited to the range 0 to $2\pi$. The phase discontinuities can be resolved (phase-unwrapping) by extending the range beyond 0 to $2\pi$. The phases $\varphi_0(x, y)$ in the phase map can then be converted into heights h(x, y) by means of the following formula:

$$h(x, y) = \frac{\lambda}{2\pi} \frac{\varphi_0(x, y)}{2}$$

A topographical map of the dielectric layer of the DOE is created in this way. A region of the topographic map which has no bulges is preferably used to determine the height of the bulges in order to set a reference height to zero. The data points of the topographical map of the dielectric layer are then preferably used in order to adapt a function to regions having a bulge, the function corresponding to the height profile of the bulge. A two-dimensional Gaussian function is preferably fitted for rotationally symmetrical bulges. More preferably, the height of the bulge and the full width at half maximum of the bulge are determined via the adapted function.

A preferred development provides that the laser mirror provided is suitable for reflecting laser light of the first wavelength. The laser mirror, which is provided in the first step of the method and virtually represents the blank of the DOE, is preferably a highly reflective laser mirror for reflecting the laser beam having the first wavelength. In this context, highly reflective means that the laser mirror has a degree of reflection of more than 99% for the first wavelength. In particular, it is provided that an already coated dielectric laser mirror can be used. Provision is further preferably made for the laser mirror to be suitable for reflecting laser light having a first wavelength greater than 100 nm. With regard to the use of the DOE for beam shaping of high-power lasers, it is further preferably provided that the laser mirror is suitable for reflecting laser light with a power of more than 100 W/cm. This also means that the laser mirror preferably has a high damage threshold of at least 0.5 $J/cm^2$ with a pulse duration of a few picoseconds, that is, 1-30 ps.

In this context, according to a preferred development of the invention, it is provided that the laser mirror provided and the diffractive optical element have a transmission of $T \leq 10^{-2}$ for the first wavelength. In particular, the method provides that the bulges are produced such that the dielectric layer retains its highly reflective properties. This also means that the dielectric layer is not destroyed by the treatment of the laser mirror with the series of focused heating laser beams having the second wavelength. The transmission is preferably determined by measuring the power of the laser at the first wavelength, in front of and behind the diffractive optical element, using a power-calibrated photodiode.

A preferred development of the invention provides that the absorption layer consists of silicon or gold and/or the substrate consists of glass, $CaF_2$, $MgF_2$ or sapphire and/or the dielectric layer consists of $SiO_2$, $Ta_2O_5$, $TiO_2$, $HfO_2$, $Al_2O_3$, $MgF_2$, $LaF_3$, and/or $ZrO_2$, The silicon in the absorption layer is particularly preferably amorphous silicon. Provision is also preferably made for the substrate to consist of quartz glass in order to enable the shaping of a high-power laser beam. Provision is further preferably made for the dielectric layer to comprise a plurality of layers of different material, a first material having a high refractive index in relation to the first wavelength and a second material having a low refractive index in relation to the first wavelength. Provision is further preferably made for the dielectric layer to consist of alternating layers of the high refractive index material and the low refractive index material. In particular, it is provided that the dielectric layer is designed such that the laser beam having the first wavelength is reflected at the dielectric layer. In other words, this means that a degree of reflection of the dielectric layer for the first wavelength is greater than 99%, both for the laser mirror provided and for the DOE produced by the method.

In connection with the creation of the bulges, the method provides that when the laser mirror is treated with a series of focused heating laser beams, heat input from the heating laser beam into a volume of the dielectric layer or into a volume of the absorption layer of the laser mirror is at least 30 $kJ/cm^3$. This makes it possible to produce bulges having a height of more than 50 nm in a particularly simple manner.

In connection with the height of the bulges, the method provides that the height of the bulges can be influenced by a heat input of the heating laser beam per volume into the absorption layer and/or into the dielectric layer. A preferred development provides that when treating the laser mirror with a series of focused heating laser beams, the second wavelength, a power of the heating laser beam, a focusing of the heating laser beam, a heating duration, the absorption layer of the laser mirror, the dielectric layer of the laser mirror and/or a layer thickness the absorption layer can be selected such that at least one bulge has a height of at least half the first wavelength.

The heat input of the heating laser beam can be controlled by different parameters. The wavelength of the heating laser beam, that is, the second wavelength, and an absorption spectrum of the absorption layer and/or the dielectric layer are preferably matched to one another. This ensures that a portion of the heating laser beam is absorbed by the absorption layer and/or the dielectric layer.

In this context, a preferred development provides that when treating the laser mirror with a series of focused heating laser beams, the second wavelength is between 200 and 700 nm and the absorption layer of the laser mirror is made of silicon, or that the second wavelength is between 200 and 2000 nm and the absorption layer of the laser mirror is made of gold, and/or the second wavelength is between 100 and 2000 nm. The bulges having a height of more than 50 nm can be produced very reliably by means of these combinations of wavelength of the heating laser beam and absorption layer. If the absorption layer is omitted, a UV laser having a second wavelength in the range of 100 to 400 nm is preferably used to treat the laser mirror with the series of focused heating laser beams.

As already mentioned, the heat input of the heating laser beam per volume into the absorption layer and/or dielectric layer can be influenced by the power of the heating laser beam. In this regard, according to a preferred development, when the laser mirror is treated with a series of focused heating laser beams, the power of the heating laser beam is at least 10 mW. The power is particularly preferably between 10 and 1000 mW.

Provision is also preferably made for the power of the heating laser beam to be changed when the laser mirror is treated with a series of focused heating laser beams. This makes it easy to change the height of the bulges. In particular, by changing the power of the heating laser beam, it is particularly easy to produce bulges having different heights and to produce height resolutions of at least 0.5 nm.

With regard to the production of the bulges, a preferred development provides that when the laser mirror is treated with a series of focused heating laser beams, the heating laser beam strikes the absorption layer and/or dielectric layer perpendicularly through the substrate of the laser mirror. In other words, this means that a back side of the laser mirror is irradiated with the series of focused heating laser beams, Provision is further preferably made for the substrate of the laser mirror and the wavelength of the heating laser beam, that is, the second wavelength, to be matched to one another, so that the heating laser beam is substantially not absorbed by the substrate.

As already mentioned, the heat input of the heating laser beam per volume into the absorption layer and/or dielectric layer can be controlled by different parameters. In this context, it is provided that when the laser mirror is treated with a series of focused heating laser beams, the heating laser beam is focused onto the absorption layer and/or dielectric layer with a full width at half maximum of at most 5 μm. Provision is particularly preferably made for the heating laser beam to have a full width at half maximum of 1.8 μm or less. This makes it possible to generate heat input locally in the absorption layer and/or dielectric layer, so that the bulges of the dielectric layer are also local. In particular, it is possible using this focusing to produce the plurality of bulges, which are preferably spaced apart by 3 μm or less than 3 μm. The distance between two bulges preferably relates to the peak-to-peak distance of two bulges in the plane perpendicular to the absorption layer.

A further preferred development of the invention provides that when the laser mirror is treated with a series of focused heating laser beams, the heating duration of the heating laser beam is between 1 μs and 1 ms. This has proven to be particularly well suited to producing bulges having heights greater than 50 nm. A shorter heating duration can lead to the destruction of the provided laser mirror. A longer heating duration can lead to the destruction of the dielectric layer, which in particular could result in the loss of the highly reflective properties of the DOE.

Not only do the parameters already mentioned, that is, the second wavelength, the power of the heating laser beam, the focusing of the heating laser beam, the heating duration, the optional absorption layer and the dielectric layer of the laser mirror have an influence on the height of the bulges, but also the layer thickness of the absorption layer. The layer thickness of the absorption layer refers to the extension of the absorption layer perpendicular to its extension. A preferred development provides that the layer thickness of the absorption layer is greater than 30 nm. The layer thickness of the absorption layer is particularly preferably more than 40 nm. This makes it particularly easy to generate a high heat input per volume in the absorption layer, so that the bulges have a height of more than 50 nm.

A preferred development of the invention provides that when the laser mirror is treated with a series of focused heating laser beams on an area of at least 0.25 $cm^2$, the bulges of the plurality of bulges are produced arranged in a grid-like manner relative to one another. The grid-like arrangement of the bulges preferably refers to the plane parallel to the absorption layer, it being possible for the grid-like arrangement of the bulges to be oblique, rectangular, centered-rectangular, hexagonal or square. Deviations from the translational symmetry of the grid-like arrangement are also possible. Further preferably, the plurality of bulges is present over the area of at least 0.25 $cm^2$, the bulges preferably being spaced apart by 3 μm or less than 3 μm. The distance between two bulges preferably relates to the peak-to-peak distance of two bulges in the plane perpendicular to the absorption layer.

In principle, it is possible that when treating the laser mirror with a series of focused heating laser beams, the heating laser beam is deflected in two dimensions during the treatment and the laser mirror is not displaced during this time. The grid-like arrangement of bulges is reliably achieved in this way. However, a preferred development of the method provides that when treating the laser mirror with a series of focused heating laser beams, the laser mirror is displaced during the treatment along a displacement direction perpendicular to the heating laser beam and the heating laser beam is deflected perpendicular to the displacement direction during the treatment. This makes it possible to produce a DOE in a particularly quick and precise manner, the dielectric layer of which has a plurality of bulges arranged in a grid-like manner relative to one another over an area of at least 0.25 $cm^2$. Furthermore, this results in the necessary precision so that the bulges of the plurality of bulges are preferably 3 μm or less than 3 μm spaced apart from one another. By displacing the laser mirror along the displacement direction perpendicular to the heating laser beam during the treatment and deflecting the heating laser beam perpendicular to the displacement direction during the treatment, the plurality of bulges can be generated on an area of 0.25 $cm^2$ within less than 60 minutes.

Further advantages and technical features of the method for producing a DOE result for the person skilled in the art from the description of the DOE, the description of the device for carrying out the method and from the description of the exemplary embodiment.

Furthermore, the invention relates to a diffractive optical element, DOE, for beam shaping of a laser beam having a first wavelength of at least 100 nm, the diffractive optical element having a layered structure made of a substrate, optionally an absorption layer and a dielectric layer, the dielectric layer adjoining the substrate or the absorption layer being located between the substrate and the dielectric layer, the dielectric layer having a plurality of bulges, the bulges having a height perpendicular to the dielectric layer, and at least one bulge having a height of more than half the first wavelength.

The core of the invention thus lies in the fact that the different optical path lengths required for the beam shaping of the laser beam are implemented on the DOE by bulges of the dielectric layer. A very high diffraction efficiency can thus be achieved, which, converted to the manufacturing accuracy of quasi-continuous DOEs, can correspond to a number of steps of more than 2500. Provision is preferably made for the height of the at least one bulge of the DOE to be greater than 50 nm. The DOE is therefore preferably suitable for beam shaping of laser beams having a first wavelength that is greater than 100 nm. Furthermore, it is preferably provided that the bulges are Gaussian-shaped in relation to a plane perpendicular to the dielectric layer and have a full width at half maximum of at least 2 μm. More preferably, the full width at half maximum is not larger than 6 μm.

In particular, the DOE is a reflective DOE, This means that the beam shaping of the laser beam having the first wavelength takes place by reflection of the laser beam on the diffractive optical element. In contrast to DOEs, in which the beam is formed by transmission of the laser beam through the DOE (transmittive DOEs), it is therefore preferably a DOE in which the laser beam is reflected. This has the advantage that, in contrast to transmissive DOES, there are only low absorption losses and high efficiency is made possible.

Furthermore, the invention relates to a device for carrying out the above method, the device comprising a heating laser for generating a heating laser beam having the second wavelength, a laser mirror positioning device for providing a laser mirror, a focusing device for focusing the heating laser beam on the laser mirror, a deflection device and a controller, the laser mirror positioning device being designed to displace the laser mirror in a displacement direction, the deflection device being designed to deflect the heating laser beam perpendicular to the displacement direction, and the controller being designed to actuate the heating laser, the deflection device and the laser mirror positioning device. In particular, it is provided that the deflection device is designed to deflect the heating laser beam in one direction. In other words, the deflection device is preferably a 1-dimensional deflection device. Said deflection devices have the advantage that they can set very large deflection angles with great precision and speed. In order to be able to produce a grid-like arrangement of bulges by means of the device, it is provided that the laser mirror positioning device is designed such that the laser mirror can be displaced in the displacement direction. The laser mirror positioning device is preferably a computer-controlled positioning stage having nanometer resolution.

With regard to further advantages and technical features of the method for producing the diffractive optical element, the diffractive optical element and the device for carrying out the method, reference is made to the figures and the further description.

The invention is explained below by way of example with reference to the drawings using a preferred embodiment example.

Figure 2:
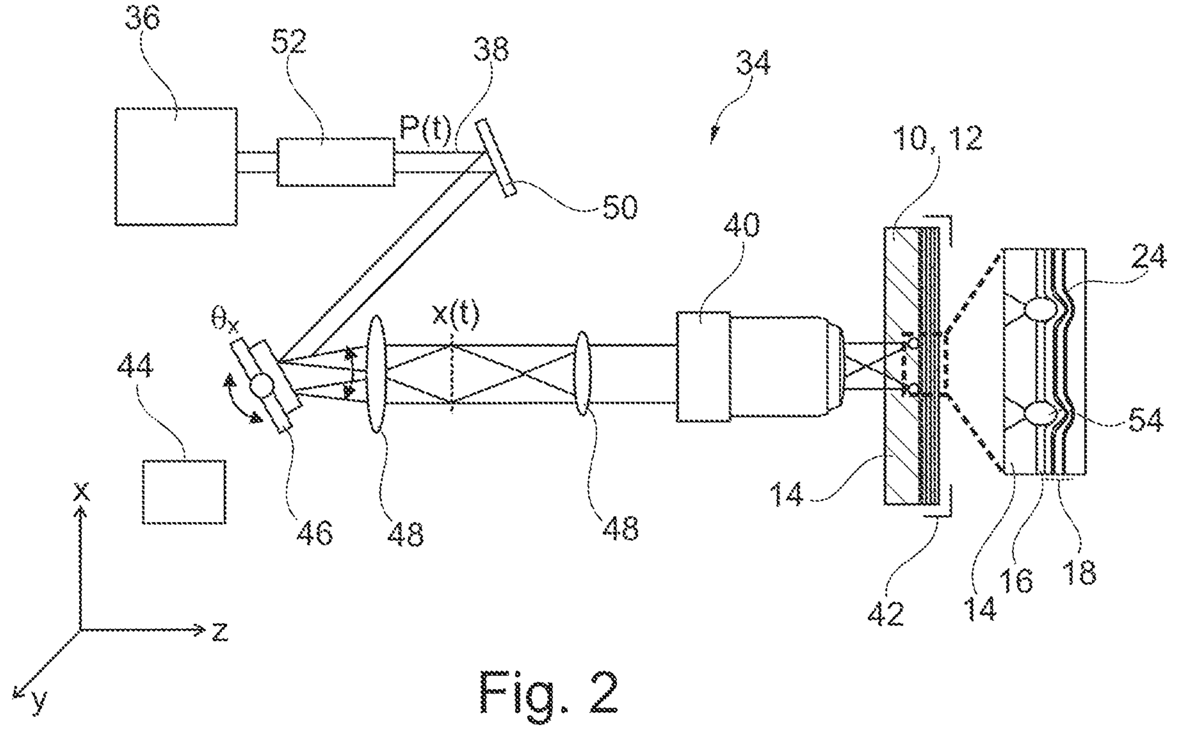

The drawings show FIG. 1 a schematic representation of the method for producing a diffractive optical element and a sectional representation of the diffractive optical element according to a preferred embodiment of the invention and FIG. 2 a schematic device for carrying out the method for producing the diffractive optical element according to a preferred embodiment of the invention.

FIG. 1 shows a schematic representation of the method for producing a diffractive optical element 10, DOE 10 for short, and a sectional representation of the DOE 10 according to a preferred embodiment of the invention. The method provides for two steps, a laser mirror 12 being provided as a blank for the DOE 10 in a first step. The laser mirror 12 is suitable for reflecting a laser beam having a first wavelength $\lambda_1$. In the present case, it is a laser mirror 12 for reflecting laser beams having a wavelength $\lambda_1$ of 0.532 nm, that is, laser light in the green wavelength range. Furthermore, the laser mirror 12 is suitable for a high-power laser and has a high damage threshold. In this embodiment example, the laser mirror 12 has a layered structure made of a substrate 14, an absorption layer 16 and a dielectric layer 18. All three layers 14, 16, 18 are parallel to one another in the present case, the absorption layer 16 being arranged between the substrate 14 and the dielectric layer 18. The dielectric layer 18 in turn comprises a plurality of material layers 20, 22 made of two different materials which are layered alternately, the first material having a high refractive index in relation to the first wavelength $\lambda_1$ and the second material having a low refractive index in relation to the first wavelength $\lambda_1$.

Bulges 24 of the dielectric layer 18 are produced in a second step of the method for producing the DOE 10. In the embodiment example preferred here, said bulges are rotationally symmetrical bulges produced at an interface between the dielectric layer 18 and the absorption layer 16. An axis of rotation 26 of the rotationally symmetrical bulges 24 is perpendicular to the absorption layer 16. As can be seen in FIG. 1, in the present case, the dielectric layer 18 does not rest against the absorption layer 16 at the bulge 24 but is detached from the absorption layer 16 at the bulge 24. A cavity 28 is located at the bulge 24 between the dielectric layer 18 and the absorption layer 16. The bulge 24 has a Gaussian shape in relation to said plane in a section through the bulge 24 along a plane perpendicular to the absorption layer 16.

In the embodiment example preferred here, the substrate 14 of the laser mirror 12 and thus also of the DOE 10 is made of quartz glass and the absorption layer 16 is made of amorphous silicon. Furthermore, a layer thickness 30 of the absorption layer is 40 nm in the present case. The layer thickness 30 refers to the dimension of the absorption layer 28 perpendicular to its extension.

The bulges 24 of the dielectric layer 18 are produced by treating the laser mirror 12 with a series of focused heating laser beams 38 (shown only in FIG. 2) having a second wavelength $\lambda_2$, a heat input 54 of the heating laser beam 38 in a volume of the absorption layer 16 of the laser mirror 12 being greater than 30 kJ/cm$^3$. At least one bulge 24 of the bulges 24 produced thus has a height 32 of at least half the first wavelength $\lambda_1$. The present case therefore has at least one bulge 24 having a height 32 of at least 266 nm.

FIG. 2 schematically shows a device 34 for carrying out the method for producing, the DOE 10. The device 34 comprises a heating laser 36 for generating the heating laser beam 38 having the second wavelength $\lambda_2$, a focusing device 40 for focusing the heating laser beam 38, a laser mirror positioning device 42 and a controller 44. In the embodiment example preferred here, the heating laser 36 generates the second wavelength $\lambda_2$ of 532 nm. Device 34 further comprises a deflection device 46 for deflecting the heating laser beam 38. In the present case, this is implemented using a 1-dimensional galvo scanner 46 which is designed to deflect the heating laser beam 38 in one direction. In FIG. 2, the direction of the heating laser beam 38 to the laser mirror 12 corresponds to the z-direction. The galvo scanner 46 allows the heating laser beam 38 to be deflected in the x-direction. Furthermore, the device 34 comprises an acousto-optical modulator 52 which can change the intensity and thus the power of the heating laser beam 38.

In order to produce a grid-like arrangement of bulges 24 of the dielectric layer 18 by means of the device, the laser mirror positioning device 42 is designed such that the laser mirror 12 can be displaced. The displacement direction of the laser mirror 12 here is the y-direction, that is, perpendicular to the direction of the heating laser beam 38 and perpendicular to the deflection direction of the galvo scanner 46.

Furthermore, the controller is designed to actuate the heating laser 36, the acousto-optical modulator 52, the deflection device 46 and the laser mirror positioning device 42.

Furthermore, in the embodiment example preferred here, the focusing device 40 for focusing the heating laser beam 38 is implemented by a confocal microscope. The confocal microscope ($f_{Objektiv}$=2 cm; $f_{Tubus}$=$f_2$=30 cm) focuses the heating laser beam 38 onto the absorption layer 16.

The heating laser 36, the focusing device 40, the laser mirror positioning device 42 and the deflection device 46 are arranged relative to one another with the aid of a mirror 50 and lenses 48 such that the heating laser beam 38 strikes the absorption layer 16 of the laser mirror perpendicularly. The heating laser beam 38 strikes a rear side of the laser mirror 12 and penetrates through the substrate 14 to the absorption layer 16. The absorption of the heating laser beam 38 results in a local heat input 54 of at least 30 kJ/cm$^3$ in the absorption layer 16, which leads to the formation of the bulge 24.

LIST OF REFERENCE CHARACTERS

10 diffractive optical element, DOE.
12 laser mirror
14 substrate
16 absorption layer
18 dielectric layer
20 material layer made of first material
22 material layer made of second material
24 bulge
26 axis of rotation
28 cavity
30 layer thickness of the absorption layer
32 height of the bulge
34 device
36 heating laser
38 heating laser beam
40 focusing device, confocal microscope
42 laser mirror positioning device, positioning stage
44 controller
46 deflection device, galvo scanner
48 lens
50 mirror
52 acousto-optic modulator
54 heat input

The invention claimed is:

1. A method for producing a diffractive optical element for beam shaping of a laser beam having a first wavelength of at least 100 nm, comprising the steps:

providing a laser mirror, the laser mirror having a layered structure made of a substrate and a dielectric layer, the dielectric layer resting against the substrate, or the laser mirror having a layered structure made of a substrate, a dielectric layer and an absorption layer, the absorption layer being located between the substrate and the dielectric layer, wherein the dielectric layer comprises a layered structure with a plurality of layers of different refractive indices, generating a plurality of bulges of the dielectric layer by treating the laser mirror with a series of focused heating laser beams having a second wavelength, wherein the plurality of bulges are formed directly by the heating laser beams in situ without adding any additional material or removing any material from the laser mirror, the plurality of bulges having a height perpendicular to the dielectric layer, and at least one bulge having a height of at least half the first wavelength, wherein the layered structure of the dielectric layer is maintained for the bulges, and wherein the generated bulges are permanent bulges that remain in the dielectric layer after the heating laser beams are no longer applied.

2. The method according to claim 1, wherein the laser mirror provided and the diffractive optical element have a transmission of $T \leq 10^{-2}$ for the first wavelength.

3. The method according to claim 1, wherein the absorption layer consists of silicon or gold, the substrate consists of glass, $CaF_2$, $MgF_2$ or sapphire and/or the dielectric layer consists of $SiO_2$, $Ta_2O_5$, $TiO_2$, $HfO_2$, $Al_2O_3$, $MgF_2$, $LaF_3$, and/or $ZrO_2$.

4. The method according to claim 1, wherein when treating the laser mirror with a series of focused heating laser beams, a heat input of the heating laser beam into a volume of the dielectric layer or into a volume of the absorption layer of the laser mirror is at least 30 $kJ/cm^3$.

5. The method according to claim 1, wherein when treating the laser mirror with a series of focused heating laser beams, the second wavelength, a power of the heating laser beam, a focusing of the heating laser beam, a heating duration, the absorption layer of the laser mirror, the dielectric layer of the laser mirror and/or a layer thickness of the absorption layer are selected such that at least one bulge has a height of at least half the first wavelength.

6. The method according to claim 1, wherein the layer thickness of the absorption layer is greater than 30 nm.

7. The method according to claim 1, wherein when treating the laser mirror with a series of focused heating laser beams, the second wavelength is between 200 and 700 nm and the absorption layer of the laser mirror is made of silicon.

8. The method according to claim 1, wherein when treating the laser mirror with a series of focused heating laser beams, a power of the heating laser beam is at least 10 mW.

9. The method according to claim 1, wherein when treating the laser mirror with a series of focused heating laser beams, the heating laser beam is focused onto the absorption layer and/or the dielectric layer with a full width at half maximum of at most 5 μm.

10. The method according to claim 1, wherein when treating the laser mirror with a series of focused heating laser beams, the heating duration of the heating laser beam is between 1 μs and 1 ms.

11. The method according to claim 1, wherein when treating the laser mirror with a series of focused heating laser beams, the laser mirror is displaced during the treatment along a displacement direction perpendicular to the heating laser beam and the heating laser beam is deflected during the treatment perpendicularly to the displacement direction, or the laser mirror is displaced during the treatment along two mutually orthogonal displacement directions, both perpendicular to the heating laser beam.

12. A device for performing the method according to claim 1, the device comprising a heating laser for producing a heating laser beam having the second wavelength, a laser mirror positioning device for providing a laser mirror, a focusing device for focusing the heating laser beam onto the laser mirror, a deflection device and a controller, the laser mirror positioning device being designed to displace the laser mirror in a displacement direction, the deflection device being designed to deflect the heating laser beam perpendicularly to the displacement direction, and the controller being designed to actuate the heating laser, the deflection device and the laser mirror positioning device.

13. A diffractive optical element for beam shaping of a laser beam having a first wavelength of at least 100 nm, the beam shaping of the laser beam having the first wavelength taking place by reflection of the laser beam on the diffractive optical element, the diffractive optical element having a layered structure made of a substrate and a dielectric layer, the dielectric layer adjoining the substrate, or the diffractive optical element having a layered structure made of a substrate, a dielectric layer and an absorption layer, the absorption layer being located between the substrate and the dielectric layer, wherein the dielectric layer comprises a layered structure with a plurality of layers of different refractive indices, in both variants, the dielectric layer having a plurality of bulges, the bulges having a height perpendicular to the dielectric layer, and at least one bulge having a height of at least half the first wavelength, wherein the plurality of bulges are formed directly by a heating laser beam in situ without adding any additional material or removing any material from a laser mirror, wherein the layered structure of the dielectric layer is maintained for the bulges, and wherein the generated bulges are permanent bulges that remain in the dielectric layer after the heating laser beams are no longer applied.

* * * * *